Figure 1:
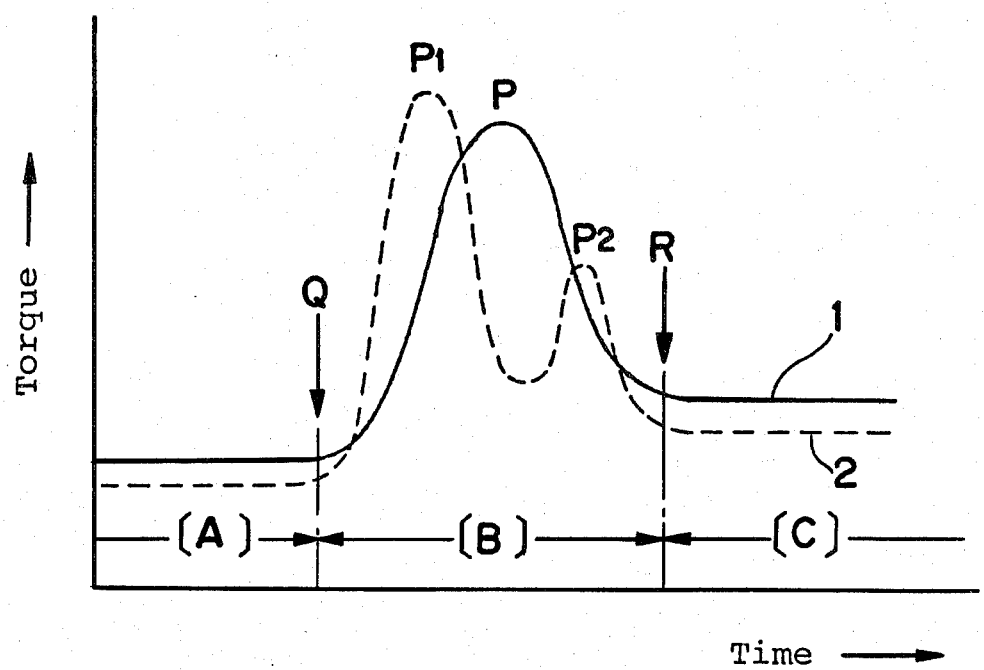

United States Patent [19]

Kawachi et al.

[11] 4,451,616

[45] May 29, 1984

[54] PROCESS FOR PREPARATION OF FILTER-CONTAINING POLYTETRAFLUOROETHYLENE FINE POWDER

[75] Inventors: Shoji Kawachi, Hyogo; Toshinori Kadowaki; Katsutoshi Yamamoto, both of Osaka, Japan

[73] Assignee: Daikin Kogyo Co., Ltd., Osaka, Japan

[21] Appl. No.: 171,907

[22] Filed: Jul. 24, 1980

[30] Foreign Application Priority Data

Jul. 24, 1979 [JP] Japan ............................ 54-94460

[51] Int. Cl.³ ..................... C08K 5/02; C08J 3/16
[52] U.S. Cl. ............................. 525/178; 264/127; 524/514; 524/545; 525/180; 526/255; 528/498; 528/499
[58] Field of Search .......... 525/178, 180, 498, 499; 260/42.55, 42.27, 34.2, 29.6 F; 526/255; 528/498, 499; 264/127; 524/514, 545

[56] References Cited

U.S. PATENT DOCUMENTS

| 3,527,857 | 9/1970 | Fitz et al. ........................ 264/117 |
| 3,674,762 | 7/1972 | Izumo et al. ...................... 264/5 |
| 3,691,123 | 9/1972 | Clarke et al. ................. 260/33.6 A |
| 3,772,249 | 11/1973 | Morgan ......................... 260/42.55 |
| 3,793,287 | 2/1974 | Fitz et al. ...................... 260/42.55 |
| 3,908,038 | 9/1975 | Nienart et al. ................. 260/42.27 |
| 3,915,916 | 10/1975 | Leverett ........................ 260/42.27 |
| 3,980,612 | 9/1976 | Gangal .......................... 260/42.27 |
| 4,087,394 | 5/1978 | Concannon .................... 260/29.6 F |
| 4,123,606 | 10/1978 | Malholtra ...................... 260/42.55 |
| 4,143,110 | 3/1979 | Morozumi et al. ............... 264/127 |
| 4,163,142 | 8/1979 | Mansure ........................ 260/42.55 |
| 4,241,137 | 12/1980 | Izumo et al. ................... 428/402 |

FOREIGN PATENT DOCUMENTS 52-38563 3/1977 Japan ................................ 524/546

Primary Examiner—Herbert J. Lilling
Attorney, Agent, or Firm—Birch, Stewart, Kolasch & Birch

[57] ABSTRACT

A process for preparation of filler-containing polytetrafluoroethylene fine powder by coagulating polytetrafluoroethylene together with at least one filler selected from the group consisting of polyimide resins, polyamide-imide resins, polyamide resins and carbon fiber powders from their aqueous dispersion, characterized in that a water-insoluble organic liquid having a boiling point of from 30° to 150° C. and a surface tension of not more than 35 dyne/cm at 20° C. is added to the aqueous dispersion under agitation at any stage from the start to the end of the coagulation.

7 Claims, 1 Drawing Figure

PROCESS FOR PREPARATION OF FILTER-CONTAINING POLYTETRAFLUOROETHYLENE FINE POWDER

The present invention relates to a process for the preparation of filler-containing polytetrafluoroethylene fine powder, that is, polytetrafluoroethylene containing a filled material.

Powder of polytetrafluoroethylene (hereinafter referred to as "PTFE") is classified roughly into molding powder and fine powder. The latter, i.e. fine powder, can be prepared by coagulating colloidal PTFE particles, each having a diameter of about 0.1 to 0.3$\mu$, from their aqueous dispersion which may be obtained by emulsion polymerization of tetrafluoroethylene (hereinafter referred to as "TFE") [U.S. Pat. Nos. 2,559,750, 2,559,752 and 2,662,065]. Since the thus obtained PTFE fine powder is easily wetted with an organic solvent, it can be subjected to paste extrusion molding in the form of a mixture with an extrusion aid such as naphtha for preparation of a shaped product such as a thin wall tube, a pipe or a sheet. Further, it is usable for coating a wire.

In general, shaped products of PTFE are excellent in heat resistance, chemical resistance, electric insulation and electric characteristics. Further, they are characteristic in having non-sticking property and a low coefficient of friction. However, they are inferior in mechanical properties such as compression strength and abrasion resistance. In order to improve these defective properties, particularly minimize the deformation on compression and enhance the abrasion resistance, the incorporation of fillers, that is filled materials, such as polyimide resins, polyamide-imide resins and polyamide resins has been proposed on the PTFE molding powder.

Recently, the same attempts as above have been made on the PTFE fine powder for improving the mechanical properties. For the incorporation of fillers into the PTFE fine powder, there are two processes, of which one is the dry blend process and the other is the wet blend process. The dry blend process comprises mixing the PTFE fine powder, obtained by coagulation of colloidal PTFE particles from their aqueous dispersion, with a filler. In this process, however, the uniform mixing of the particles of the PTFE fine powder and the particles of the filler is not readily attained, because the PTFE fine powder is present as the agglomerates of the primary particles. In addition, the PTFE fine powder is deformed due to the mechanical force applied thereto on the mixing so that a shaped product having a uniform inner structure is hardly obtainable. The wet blend process, which does not have such defects as seen in the dry blend process, comprises coagulating colloidal PTFE particles together with a filler from their aqueous dispersion.

Besides, it is known that on coagulation of colloidal PTFE particles from their aqueous dispersion, the existence of a water-insoluble liquid is effective in agglomerating the coagulated particles to make spherical or granular particles of an appropriate particle size. For instance, a water-insoluble organic liquid may be added to an aqueous dispersion of colloidal PTFE particles including carbon powder as the filler prior to or after the coagulation, whereby agglomerization is attained efficiently (cf. Japanese Patent Publication No. 34653/1977).

The above known procedure effective in agglomerization of the coagulated particles of colloidal PTFE particles with carbon powder was applied to coagulation of colloidal PTFE particles with a filler chosen from polyimide resins, polyamide-imide resins, polyamide resins and carbon fiber powders. Thus, a water-insoluble organic liquid was added to an aqueous dispersion of colloidal PTFE particles comprising a filler chosen from polyimide resins, polyamide-imide resins, polyamide resins and carbon fiber powders prior to or after the coagulation. Unexpectedly, however, the separation between PTFE and the filler and the uneven mixing of PTFE with the filler occurred, and the uniform mixing of PTFE with the filler could not be achieved.

As the result of an extensive study, it has now been found that the incorporation of a certain specific organic liquid into an aqueous dispersion of colloidal PTFE particles comprising a filler chosen from polyimide resins, polyamide-imide resins, polyamide resins and carbon fiber powders at a certain specific stage can give the coagulated particles of colloidal PTFE particles and the filler, both being uniformly mixed, which have excellent mechanical properties, particularly good flowability.

According to this invention, there is provided a process for preparation of filler-containing PTFE fine powder by coagulating PTFE together with at least one filler selected from the group consisting of polyimide resins, polyamide-imide resins, polyamide resins and carbon fiber powders from an aqueous dispersion of colloidal PTFE particles comprising the filler, characterized in that a water-insoluble organic liquid having a boiling point of from 30° to 150° C. and a surface tension of not more than 35 dyne/cm at 20° C. is added to the aqueous dispersion under agitation at any stage from the start to the end of the coagulation.

As PTFE, there may be used a homopolymer of TFE or a copolymer of TFE with any other polymerizable monomer (e.g. hexafluoropropylene, chlorotrifluoroethylene, perfluoroalkyl vinyl ether) as a modifier in an amount of not more than 2% by weight based on the weight of the copolymer.

The aqueous dispersion of colloidal PTFE particles is preferred to contain about 5 to 35% by weight of colloidal PTFE particles having an average particles size of from about 0.1 to 0.3$\mu$.

Among the fillers as used, polyimide resins and polyamide-imide resins are both relatively good in heat resistance and commercially available in a fine powder form. Polyimide resins are polymers having an imide bond and obtainable, for example, by reacting an aromatic tetracarboxylic anhydride (e.g. pyromellitic anhydride) with an aromatic diamine (e.g. diaminodiphenyl ether). Polyamide-imide resins are polymers having both an amide bond and an imide bond in the molecule and can be obtained, for example, by reacting an aromatic diamine having an amide group with an aromatic tetracarboxylic acid (e.g. pyromellitic acid), reacting an aromatic tricarboxylic acid (e.g. anhydrous trimellitic acid) with a diamine (e.g. 4,4'-diaminodiphenyl ether), or reacting a dibasic acid having an aromatic imide ring with a diamine. Polyamide resins are polymers having an amide bond and obtainable, for instance, by reacting a diamine with a dicarboxylic acid. The particle size of these resins may be usually from about 0.1 to 100$\mu$. Carbon fiber powder may be prepared by finely pulverizing carbon fibers. Preferably, each particle has a diameter of from about 3 to 30$\mu$ and an average length of from about 10 to 1000$\mu$.

The filler or filled material may be added as such to an aqueous dispersion of colloidal PTFE particles, but when its particle size is very small, the homogeneous dispersion is sometimes difficult. In such case, the filler may be admixed with water and stirred thoroughly to make an aqueous dispersion, which is added to the aqueous PTFE dispersion. Each of the fillers is hydrophilic to some extent since it can be dispersed into water without much difficulty. However, its hydrophilic nature seems to be not so strong since when shaken with a mixture of water and 1,1,2-trichloro-1,2,2-trifluoroethane, the filler migrates to the organic layer after two phases are separated.

The weight proportion of PTFE and the filler in their aqueous dispersion may be usually from 100:5 to 80.

In the process of the present invention, coagulation can be initiated by simply stirring as in a conventional process for coagulating an aqueous dispersion of colloidal PTFE particles. However, it takes a long time to coagulate the whole PTFE particles together with the filler particles. Further, the starting point of coagulation is varied within a broad range of time so that careful observation is necessary over a long period of time. For these reasons, it is preferred to use a coagulating agent, because its incorporation into the aqueous dispersion initiates the coagulation immediately. The coagulating agent may be any conventional one for coagulation of colloidal PTFE particles from this aqueous dispersion. Examples of the coagulating agent are water-soluble inorganic salts (e.g. magnesium chloride, aluminum chloride), mineral acids (e.g. nitric acid, hydrochloric acid, sulfuric acid), water-soluble organic liquids (e.g. alcohols, acetone), cationic surfactants, etc.

The water-insoluble organic liquid to be employed is the one having a boiling point of from 30° to 150° C. and a surface tension of not more than 35 dyn/cm at 20° C. Specific examples of such organic liquid are hydrocarbons (e.g. hexane, heptane, toluene, gasoline, kerosene), chlorinated hydrocarbons (e.g. carbon tetrachloride, trichloroethylene), fluorine-containing hydrocarbons (e.g. trichlorotrifluoroethane, tetrachlorodifluoroethane, trichlorofluoromethane), etc. Usually, these organic liquids may be added in a proportion of from 30 to 100 Parts by weight to 100 parts by weight of the solid components in the aqueous dispersion. The introduction of the water-insoluble organic liquid may be effected at any stage from the start to the end of the coagulation.

In carrying out the process of the present invention, the operations are usually made as follows: the filler or its aqueous dispersion is added to an aqueous dispersion of colloidal PTFE particles under stirring, and the resulting mixture is stirred thoroughly to blend the PTFE particles and the filler particles homogeneously. The coagulating agent is then added thereto, whereby the coagulation of the PTFE particles together with the filler particles starts. Then, the water-insoluble organic liquid is added thereto at any stage up to the completion of the coagulation.

One of the characteristic features of this invention resides in the addition of the water-insoluble organic liquid to the aqueous dispersion comprising the PTFE particles and the filler particles during a certain period.

Explaining this characteristic feature with reference to the accompanying drawing, FIG. 1 shows a schematic representation of the torque change of an aqueous dispersion of colloidal PTFE particles with the lapse of time, i.e. before, during and after the coagulation, and Curves 1 and 2 represent typical examples of such torque change.

In FIG. 1, Q represents the point at which a coagulating agent is added, and the zones [A], [B] and [C] represent respectively a zone before coagulation, a zone during coagulation and a zone after coagulation. The solid components in the aqueous dispersion are in a colloidal state at the zone [A], in a jelly-like state at the zone [B] and in a hydrophobic state at the zone [C]. The term "hydrophobic state" is intended to mean such state that the particles dispersed in water are hardly wetted with water and tend to separate from water immediately after stirring is stopped.

On coagulation of the aqueous PTFE dispersion, the torque change in most cases is representable by either one of Curve 1 having one torque peak and Curve 2 having two torque peaks. In both cases, the state of the aqueous dispersion can be definitely divided into three zones [A], [B] and [C]. As soon as a coagulating agent is added to the aqueous dispersion under stirring, coagulation is initiated at once, the solid components are jellified, and the viscosity of the dispersion increases rapidly. When the viscosity reaches the peak, the dispersed particles become hydrophobic, and the viscosity of the dispersion decreases rapidly. In case of Curve 1, the peak P corresponds to a turning point in the above phenomena. In case of Curve 2, the pak $P_1$ corresponds to a peak of viscosity, and the peak $P_2$ corresponds to a point where the dispersed particles begin to become hydrophobic. In both cases, the time when the torque becomes constant is represented by R where the coagulation is completed. When the aqueous dispersion contains the filler, the torque curve obtained is similar to Curve 1.

In the process of the invention, the water-insoluble organic liquid must be added to the aqueous dispersion at the zone [B]. Preferably, the organic liquid is added all at once around the peak P or $P_1$, because the change of viscosity can be macroscopically observed around the said peak. If the water-insoluble organic liquid is added at the zone [A], the PTFE particles in the dispersion are stabilized so that only the filler particles are coagulated. Thus, the PTFE particles remain in the dispersion, and the blend of the PTFE particles and the filler particles becomes uneven. The remained PTFE particles can be coagulated under stronger conditions, for instance, by application of strong mechanical force or heating or by addition of an excessive amount of a coagulating agent. But, in this case, the blend becomes more uneven. If the organic liquid is added at the zone [C], the coagulation of only the PTFE particles proceeds so that only a small portion of the filler particles adhere onto the outer surfaces of the coagulated PTFE particles and a large portion of the filler particles remian in the aqueous dispersion.

After the coagulation is completed, the coagulated particles are collected, washed with water and dried.

The filler-containing PTFE fine poweder thus obtained has usually a particle size of from about 200 to 500μ. It is easily separated from the dispersion, has a good flowability and hardly agglomerates after dried, so that its handling is very easy. Further, even if the proportion of the filler particles is relatively large, the homogeneous and complete blending of PTFE and the filler is attained, and the separation of the filler does not occur. It is easily shaped by paste extrusion or calendering to make a sheet, a tube, a rod, etc.

Practical embodiments of this invention are illustratively shown in the following Examples wherein % and part(s) are by weight unless otherwise indicated.

EXAMPLE 1

To polyimide resin powder having an average particle size of about 20μ (insoluble in N-methyl-2-pyrrolidone), water was added, and the resulting mixture was stirred vigorously to obtain a 5% aqueous polyimide resin dispersion. A 20% aqueous dispersion of colloidal PTFE particles (1 kg) prepared by emulsion polymerization of TFE was charged into a stainless steel made cylinder type tank having an internal volume of 3 liters and equipped with two vertical baffles of 15 mm in width on the opposite inner walls and stirred at 450 rpm by an agitator having two anchor type agitating blades, during which the temperature was adjusted at 30±2° C. by a temperature controlled jacket. To the PTFE dispersion in the tank, the above prepared polyimide resin dispersion (1 kg) was added, and stirring was continued for about 1 minute. Thereafter, 98% nitric acid (20 ml) was added thereto as a coagulating agent. Within several seconds after the addition of nitric acid, the viscosity of the dispersion rapidly rose, and the dispersion became slurry-like. A torque meter equipped to the agitator showed a torque change with time as shown in FIG. 1 (cf. Curve 2). When the torque approached the peak $P_1$, trichlorotrifluoroethane (64 ml) was added thereto all at once, and stirring was continued for 5 minutes. The content of the tank was filtered through a 60 mesh stainless steel net to collect the coagulated particles, which were dried at 150° C. for 12 hours to obtain polyimide resin-containing PTFE powder (ca. 250 g). The average particle size of the powder was 540 and each particle had minor unevenness on the surface but was almost a sphere. Thus, the powder showed a good flowability. Besides, the waste liquid from which the coagulated particles were separated was clear and contained little PTFE or polyimide resin.

EXAMPLE 2

In the same manner as in Example 1 but adding trichlorotrifluoroethane immediately after the addition of nitric acid as the coagulating agent, coagulation was effected.

COMPARATIVE EXAMPLES 1 to 5

In the same manner as in Example 1 but adding or not adding nitric acid as the coagulating agent and/or trichlorotrifluoroethane, coagulation was effected.

The physical properties of the produced powders in Examples 1 and 2 and Comparative Examples 1 to 5 were examined, and the amounts and non-coagulated polyimide resin and non-coagulated PTFE in the waste liquid were measured.

TABLE

| Example No. | Addition of coagulating agent | Addition of trichlorotrifluoroethane | Non-coagulated materials in the waste liquid Polyimide (g) | PTFE (g) | Products Apparent density (g/ml) | Average diameter (μ) |
| --- | --- | --- | --- | --- | --- | --- |
| 1 | 1 min. after start of stirring | at peak $P_1$ | 0 | 0 | 0.50 | 540 |
| 2 | 1 min. after start of stirring | just after addition of coagulating agent | 0 | 0 | 0.49 | 450 |
| Comparative 1 | — | — | 25 | 0 | 0.42 | 420 |
| Comparative 2 | — | just after peak $P_2$ | 5 | 0 | 0.52 | 480 |
| Comparative 3 | 1 min. after start of stirring | — | 15 | 0 | 0.41 | 400 |
| Comparative 4 | — | after start of stirring | 0 | 130 | *1 | |
| Comparative 5 | — | at peak $P_1$ | 0 | 10 | 0.43 | 540 | note:
*1 Stirring was continued for 30 minutes and stopped since coagulation of polyimide particles alone was observed.

COMPARATIVE EXAMPLE 6

Water (30 liters) was charged into a stainless steel made cylinder type tank having an internal volume of 100 liters and equipped with two vertical baffles of 15 mm in width on the opposite inner walls, and then carbon fiber powder (0.9 kg) of 12.5μ in average diameter and 130μ in average length was added and throughly dispersed under stirring at 200 rpm by an agitator having two anchor type agitating blades, during which the temperature was adjusted at 30±2° C. by a temperature controlled jacket. Thereafter, a 25% aqueous dispersion of colloidal PTFE particles (20.4 liters) was charged into the tank and stirred. Within several minutes, the viscosity of the liquid rose, and the dispersion became slurry-like. Stirring was further continued until the particles became hydrophobic and floated. The floating powder was collected by filtration through 100 mesh wire net and dried. Separated waste liquid contained 0.56 kg of the carbon fiber powder. This means that the obtained powder contained only about 0.34 kg of the carbon fiber powder.

EXAMPLE 3

In the same manner as in Comparative Example 6 but adding trichlorotrifluoroethane (1.6 liters) to the tank when the dispersion became slurry-like (i.e. around the peak P in FIG. 1), coagulation was effected.

The coagulated particles were collected by filtration. The filtrate contained no carbon fiber powder. The collected particles had an average particle size of 100μ and an apparent density of 600 g/liters.

A mixture of the thus obtained powder (84 parts) and naphtha (16 parts) was paste extruded with a reduction ratio of 168 to form a tube of 4 mm in inner diameter and 5 mm in outer diameter and calcined at 370° C. for 10 minutes. Along the direction of extrusion, the tensile strength was 11.1 kg and the elongation was 160%.

COMPARATIVE EXAMPLE 7

In the same manner as in Comparative Example 6 but adding trichlorotrifluoroethane to the tank immediately after the aqueous PTFE dispersion was added (i.e. during the zone [A] in FIG. 1), coagulation was effected. It was observed that coagulation of the carbon fiber powder alone went ahead.

COMPARATIVE EXAMPLE 8

In the same manner as in Comparative Example 6 but adding trichlorotrifluoroethane to the tank after the dispersion became slurry-like and when the torque of stirring became constant (i.e. during the zone [C] in FIG. 2), coagulation was effected. After collecting the coagulated particles by filtration, the filtrate contained 0.15 kg of the carbon fiber powder.

What is claimed is:

1. A process for the preparation of a filled material containing polytetrafluoroethylene fine powder having good flowability, by coagulating polytetrafluoroethylene together with at least one filled material selected from the group consisting of polyimide resins, polyamide-imide resins, and polyamide resins, from their aqueous dispersion, the improvement which comprises adding a water-insoluble organic liquid having a boiling point of from 30° to 150° C. and a surface tension of not more than 35 dyne/cm at 20° C. to the aqueous dispersion under agitation at any stage after the initiation of the coagulation to the end of the coagulation.

2. The process according to claim 1, wherein the aqueous dispersion is prepared by mixing an aqueous dispersion of colloidal polytetrafluoroethylene particles with the filled material or its aqueous dispersion.

3. The process according to claim 1, wherein the weight portion of the polytetrafluoroethylene and the filled material in their aqueous dispersion is 100:5-80.

4. The process according to claim 1, wherein the amount of the organic liquid to be added is from 30 to 100 parts by weight to 100 parts by weight of the solid components in the aqueous dispersion.

5. The process according to claim 1, wherein the organic liquid is added to the aqueous dispersion all at once when the viscosity of the aqueous dispersion reaches around the maximum.

6. The process according to claim 1, wherein said filler is selected from the group consisting of polyimide resins, polyamide-imide resins and polyamide resins.

7. The process of claim 1 wherein the polytetrafluoroethylene includes a homopolymer of tetrafluoroethylene or a copolymer of tetrafluoroethylene with another polymerizable monomer, said another polymerizable monomer being in an amount of not more than 2% by weight based on the weight of the copolymer.

* * * * *